(12) United States Patent
Miyake et al.

(10) Patent No.: US 9,887,605 B2
(45) Date of Patent: Feb. 6, 2018

(54) WIND-DRIVEN ELECTRICITY GENERATION DEVICE AND ROTOR ASSEMBLY THEREOF

(71) Applicants: Kunihiro Miyake, Sizuoka (JP); Nariie Omori, Kanagawa-Ken (JP); MITSUSHIN CO.,LTD., Kanagawa-Ken (JP)

(72) Inventors: Kunihiro Miyake, Sizuoka (JP); Nariie Omori, Kanagawa-Ken (JP)

(73) Assignees: KUNIHIRO MIYAKE, Sizuoka (JP); NARIIE OMORI, Kanagawa-Ken (JP); MITSUSHIN CO.,LTD., Kanagawa-Ken (JP)

(*) Notice: Subject to any disclaimer, the term of this patent is extended or adjusted under 35 U.S.C. 154(b) by 0 days.

(21) Appl. No.: 15/249,722

(22) Filed: Aug. 29, 2016

(65) Prior Publication Data
US 2017/0194835 A1 Jul. 6, 2017

(30) Foreign Application Priority Data
Dec. 31, 2015 (TW) .............................. 104144690 A (51) Int. Cl.
| | |
|---|---|
| *H02K 7/18* | (2006.01) |
| *F03D 1/04* | (2006.01) |
| *F03D 1/06* | (2006.01) |
| *F03D 9/00* | (2016.01) |
| *H02K 1/27* | (2006.01) |
| *F03D 9/25* | (2016.01) |

(52) U.S. Cl.
CPC ............... *H02K 7/183* (2013.01); *F03D 1/04* (2013.01); *F03D 1/0625* (2013.01); *F03D 9/002* (2013.01); *F03D 9/25* (2016.05); *H02K 1/2706* (2013.01)

(58) Field of Classification Search
CPC ............................ H02K 7/183; H02K 1/2706
USPC ...................................................... 290/44, 55
See application file for complete search history.

(56) References Cited

U.S. PATENT DOCUMENTS 4,720,640 A * 1/1988 Anderson ............. F03B 13/083
  290/43
5,394,016 A * 2/1995 Hickey ..................... F03B 3/12
  290/1 R (Continued)

FOREIGN PATENT DOCUMENTS

| | | |
|---|---|---|
| JP | 2005-94936 A | 4/2005 |
| JP | 2014-13034 A | 1/2014 |

*Primary Examiner* — Viet Nguyen
(74) *Attorney, Agent, or Firm* — Li&Cai Intellectual Property (USA) Office (57) ABSTRACT

A wind-driven electricity generation device includes a stator assembly and a rotor assembly. The stator assembly includes a case and a magnetically permeable module disposed on the case. The rotor assembly is rotatably arranged in the case and includes a rotating member and a magnetic module disposed on the rotating member. The rotating member has a column and a spiral blade. A gap is formed between the spiral blade and the case. The spiral blade is connected to the column at a helix angle of 21~55 degrees. The spiral blade is configured to rotate the rotor assembly with respect to the stator assembly by utilizing wind, such that an induced current is generated by the cooperation of the magnetically permeable module and the magnetic module.

5 Claims, 7 Drawing Sheets

(56) References Cited

U.S. PATENT DOCUMENTS

| | | | |
|---|---|---|---|
| 2008/0088135 A1* | 4/2008 | Novo Vidal | F03B 13/083 290/54 |
| 2010/0133937 A1* | 6/2010 | Nair | H02K 7/06 310/154.02 |
| 2010/0194117 A1* | 8/2010 | Pabon | H02K 35/02 290/1 R |
| 2010/0231066 A1* | 9/2010 | Korner | H02K 1/32 310/61 |
| 2010/0253091 A1* | 10/2010 | Tseng | H02K 53/00 290/1 R |
| 2011/0049906 A1* | 3/2011 | Hughes | F03G 7/08 290/1 C |
| 2012/0038169 A1* | 2/2012 | Azanza Ladron | H02K 1/278 290/55 |
| 2012/0070293 A1* | 3/2012 | Cwiertnia | F03D 3/002 416/176 |
| 2012/0187685 A1* | 7/2012 | Amin | F03D 3/00 290/50 |
| 2016/0254727 A1* | 9/2016 | Liao | F03G 7/08 290/1 A |
| 2017/0194836 A1* | 7/2017 | Miyake | H02K 7/1823 |

* cited by examiner

WIND-DRIVEN ELECTRICITY GENERATION DEVICE AND ROTOR ASSEMBLY THEREOF

BACKGROUND OF THE INVENTION

1. Field of the Invention

The instant invention relates to an electricity generation device; in particular, to a wind-driven electricity generation device and a rotor assembly thereof.

2. Description of Related Art

The conventional wind-driven electricity generation device is provided to generate energy by utilizing fluid to rotate the blade, and the energy generated by the conventional wind-driven electricity generation device conforms the wind-energy formula: $P=\frac{1}{2}(\rho A v^3)$, wherein $\rho$ is density of air ($kg/m^3$), A is swept area of the blade ($m^2$), v is wind velocity (m/sec). Most manufacturers believe that the swept area of the blade of the wind-energy formula is only applied to a single-layer blade, such as a fan blade.

Accordingly, the conventional explanation of the swept area of the blade in the wind-energy formula is too narrow, so the development of the wind-driven electricity generation device has been limited.

SUMMARY OF THE INVENTION

The instant disclosure provides a wind-driven electricity generation device and a rotor assembly thereof for effectively improving the problem generated from the conventional wind-driven electricity generation device. Specifically, torque of the rotating member and wind converting ratio can be increased by defining a specific helix angle of the spiral blade in the rotor assembly.

The instant disclosure provides a wind-driven electricity generation device, comprising: a stator assembly, comprising: a case, wherein the case surroundingly defines a channel, and the case defines an axis passing through the channel; and a magnetically permeable module disposed on the case; and a rotor assembly rotatably arranged in the channel of the case, comprising: a rotating member having a column and at least one spiral blade, wherein the column is rotatable along the axis, the spiral blade is connected to an outer surface of the column at a helix angle of 21~55 degrees, a gap is formed between the case and an outer edge of the spiral blade; and a magnetic module disposed on the rotating member, wherein the spiral blade is configured to be driven by utilizing fluid to rotate the rotor assembly with respect to the stator assembly, so that the magnetic module induces the magnetically permeable unit to generate induced current.

The instant disclosure also provides a rotor assembly of a wind-driven electricity generation device, comprising: a rotating member having a column and at least one spiral blade, wherein the spiral blade is connected to an outer surface of the column at a helix angle of 21~55 degrees; and a magnetic module disposed on the rotating member.

In summary, the wind-driven electricity generation device of the instant disclosure increases torque of the rotating member and wind converting ratio by defining a specific helix angle of the spiral blade, thereby effectively improving the problem generated from the conventional wind-driven electricity generation device.

Moreover, the spiral blade of the wind-driven electricity generation device provided by the instant disclosure has a large windward area to utilize wind, so the torque generated by the rotating member is greater than that of the conventional wind-driven electricity generation device.

Thus, if the spiral blade of the wind-driven electricity generation device is provided with a smaller size, the wind-driven electricity generation device still has an excellent wind converting ratio for effectively generating electricity.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

Please refer to FIGS. 1 through 9, which show an embodiment of the instant disclosure. References are hereunder made to the detailed descriptions and appended drawings in connection with the instant invention. However, the appended drawings are merely shown for exemplary purposes, rather than being used to restrict the scope of the instant invention.

Figure 1:
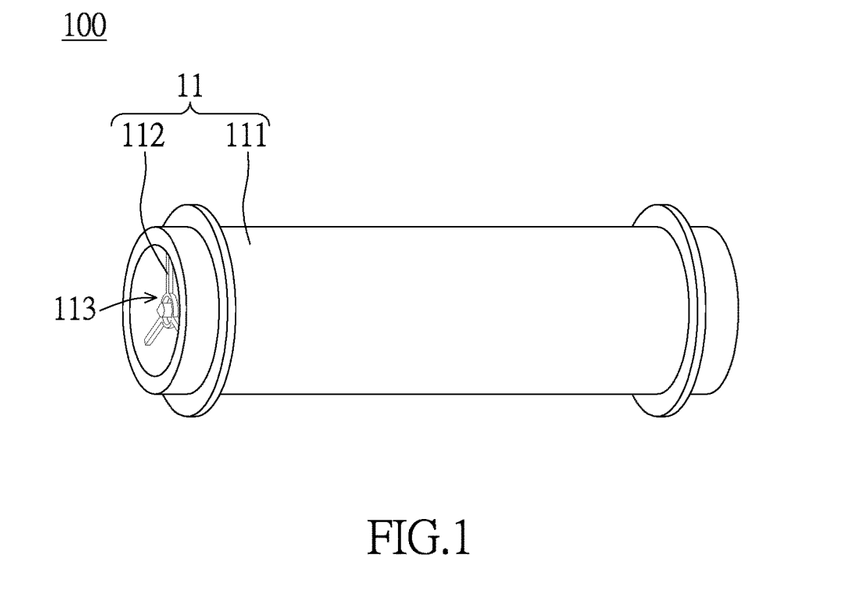
FIG. 1 is a perspective view showing a wind-driven electricity generation device according to the instant disclosure.
Figure 2:
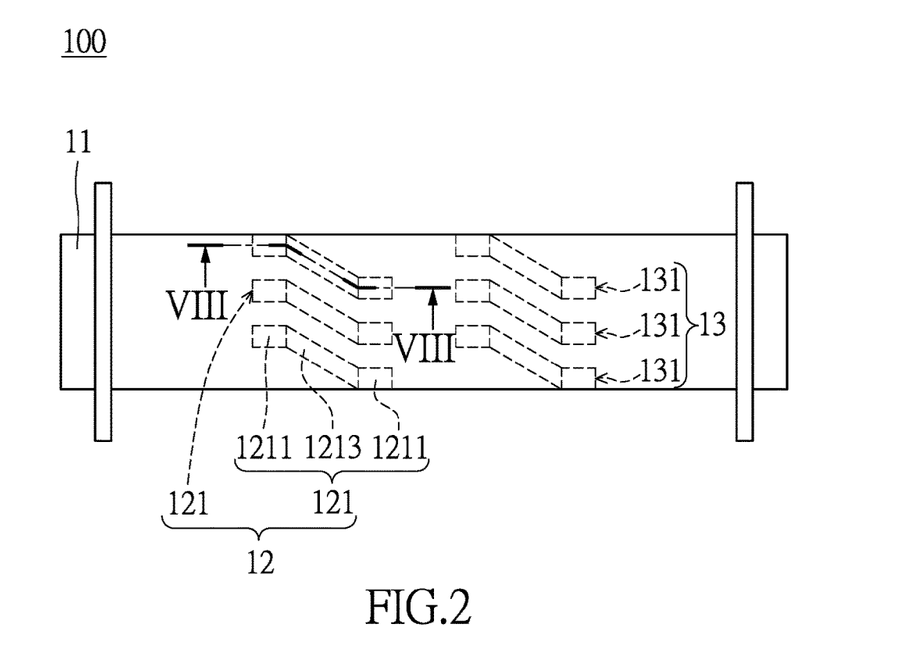
FIG. 2 is a top view of FIG. 1.
Figure 3:
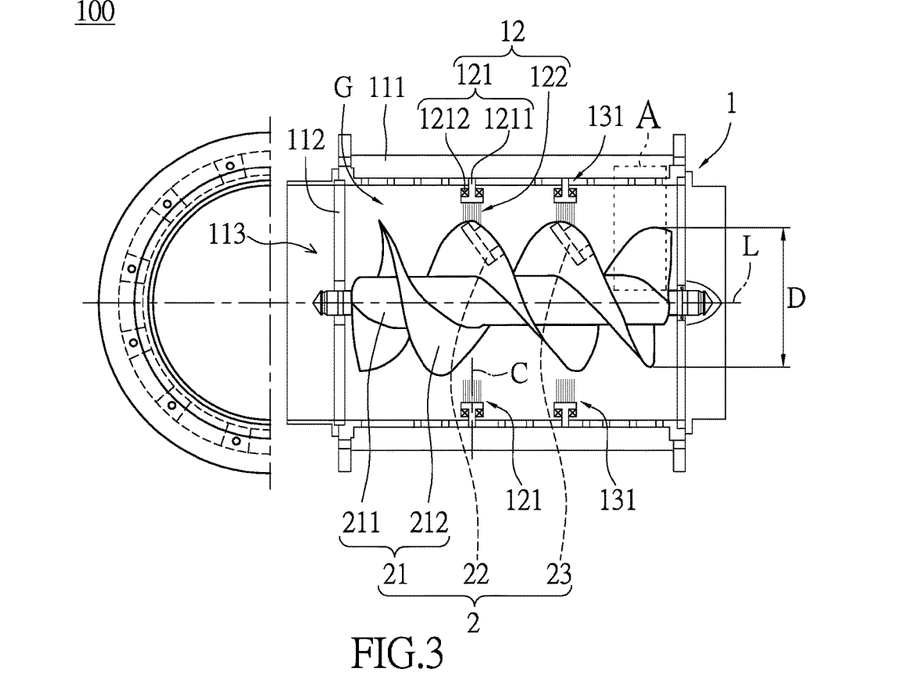
FIG. 3 is a cross-sectional view of the wind-driven electricity generation device by cutting half of the case.

Please refer to FIGS. 1 through 3, which show a wind-driven electricity generation device 100. The wind-driven electricity generation device 100 comprises a stator assembly 1 and a rotor assembly 2 installed in the stator assembly 1. The rotor assembly 2 is rotatable with respect to the stator assembly 1 for generating electricity. The following description discloses the construction of each one of the stator assembly 1 and the rotor assembly 2, and then discloses the relative features of the stator assembly 1 and the rotor assembly 2.

As shown in FIGS. 2 and 3, the stator assembly 1 has a case 11 and a first magnetically permeable module 12 disposed on the case 11. The case 11 has an elongated tube 111 and two supporting portions 112. The tube 111 in the instant embodiment is a circular tube, and the tube 111 surroundingly defines a channel 113. Moreover, the tube 111 defines an axis L passing through the channel 113. The axis L in the instant embodiment is the centerline of the tube 111, but is not limited thereto. The two supporting portions 112 are respectively installed in two opposite portions of the tube 111 (i.e., the left and right portions of the tube 111 as shown in FIG. 1), and the construction of each supporting portion 112 is suitable to provide wind to inflow and outflow the channel 113.

The first magnetically permeable module 12 includes a plurality of first magnetically permeable units 121 and a plurality of magnetically permeable brushes 122. The magnetically permeable brushes 122 are resilient. The first magnetically permeable units 121 are distributed on the tube 111 of the case 11. The number or the distribution of the first magnetically permeable units 121 can be adjusted according to a designer's request, and is not limited to the instant embodiment.

Specifically, each first magnetically permeable unit 121 includes two metallic cores 1211, two coils 1212 respectively winding around the cores 1211, and a magnetically connecting member 1213 (i.e., metallic material, silicon steel sheet, or iron sheet) connecting the two cores 1211. The magnetically connecting member 1213 can integrally or detachably connect the two cores 1211. Each first magnetically permeable unit 121 is fixed on the tube 111 of the case 11 by the cores 1211, and each core 1211 defines a centerline C approximately perpendicular to the axis L. In addition, each coil 1212 in the instant embodiment winds around the corresponding core 1211, but is not limited thereto. For example, the core 1211 of each first magnetically permeable unit 121 can be omitted.

The number of the magnetically permeable brushes 122 is equal to the number of the cores 1211, and each core 1211 is provided with one magnetically permeable brush 122. In other words, the magnetically permeable brushes 122 are respectively fixed on ends of the cores 1211 arranged away from the tube 111, and the magnetically permeable brushes 122 are arranged in the channel 113. The magnetically permeable brush 122 in the instant embodiment is made from a plurality of flexible metal wires. Two opposite ends of each metal wire are respectively defined as a fixing end and a free end, the fixing end of each metal wire is directly or indirectly fixed on the corresponding core 1211, and the free end of each metal wire is soft for avoiding scratching a contact component (i.e., the magnetic end 221 of the magnet block 221), but the construction of the magnetically permeable brush 122 is not limited thereto. Moreover, in a non-shown embodiment, the first magnetically permeable module 12 can be provided without any magnetically permeable brush 122.

Figure 8:
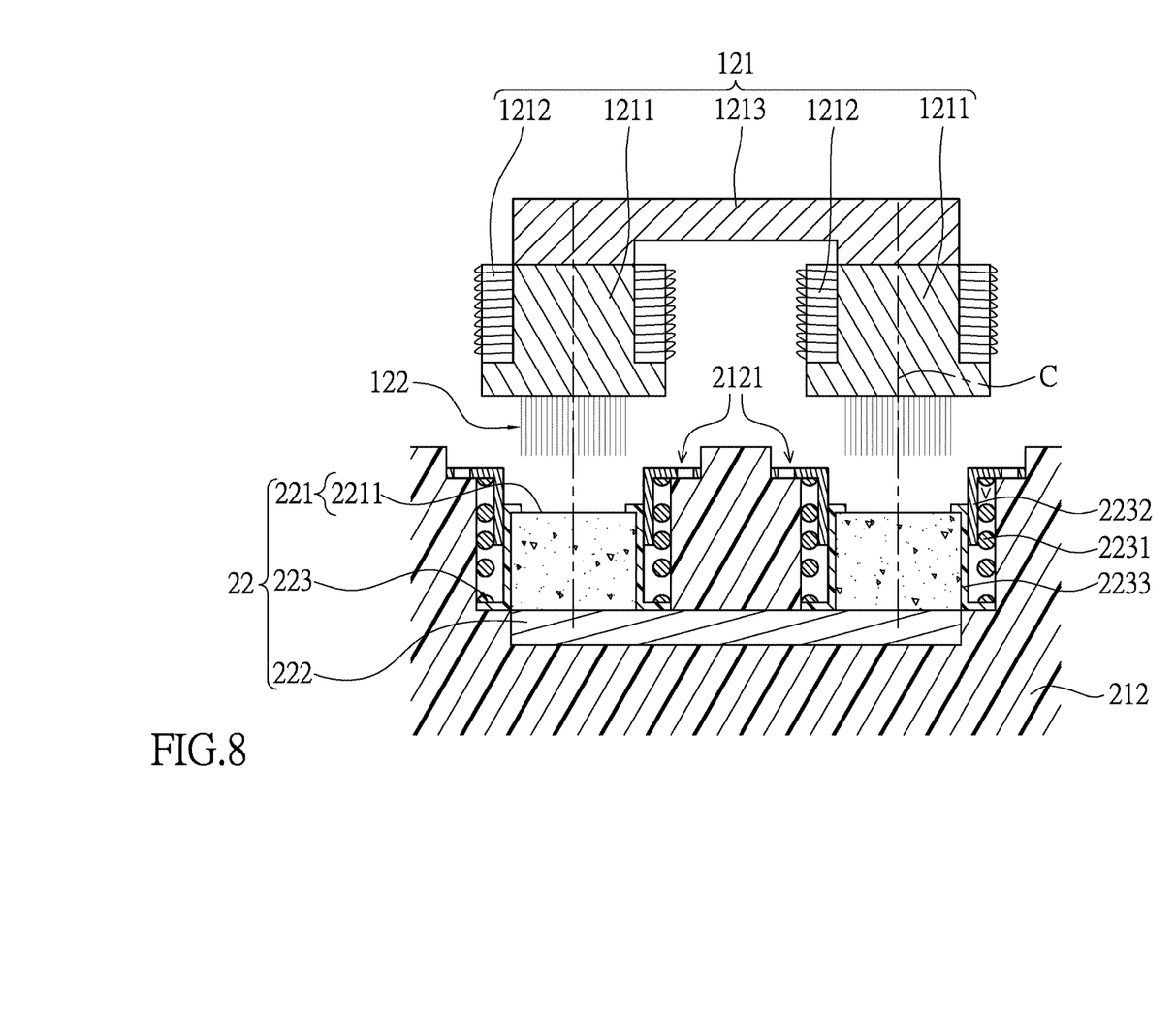
FIG. 8 is a cross-sectional view of FIG. 2 along line VIII-VIII.

As shown in FIGS. 2 and 3, the rotor assembly 2 is rotatably arranged in the channel 113 of the case 11. The rotor assembly 2 includes a rotating member 21 and a first magnetic module 22 disposed on the rotating member 21, and the rotating member 21 is rotatable along the axis L. The rotating member 21 has a column 211 and a spiral blade 212 connected to the column 211. Two opposite ends of the column 211 are respectively pivoted to the two supporting members 112, and the centerline of the column 211 in the instant embodiment overlaps the axis L. The length of spiral blade 212 in the axis L is greater than the height of the spiral blade 212, the height defined as twice the distance between an outer edge of the spiral blade 212 and the axis L. At least one accommodating trough 2121 is concavely formed on an edge of the spiral blade 212 in a radial direction perpendicular to the axis L (as shown in FIG. 8, the radial direction is substantially parallel to the centerline C). Moreover, the distance between the outer edge of the spiral blade 212 and the axis L is greater than a smallest distance between each magnetically permeable brush 122 and the axis L (i.e., a distance between the free end of each metal wire and the axis L).

Figure 4:
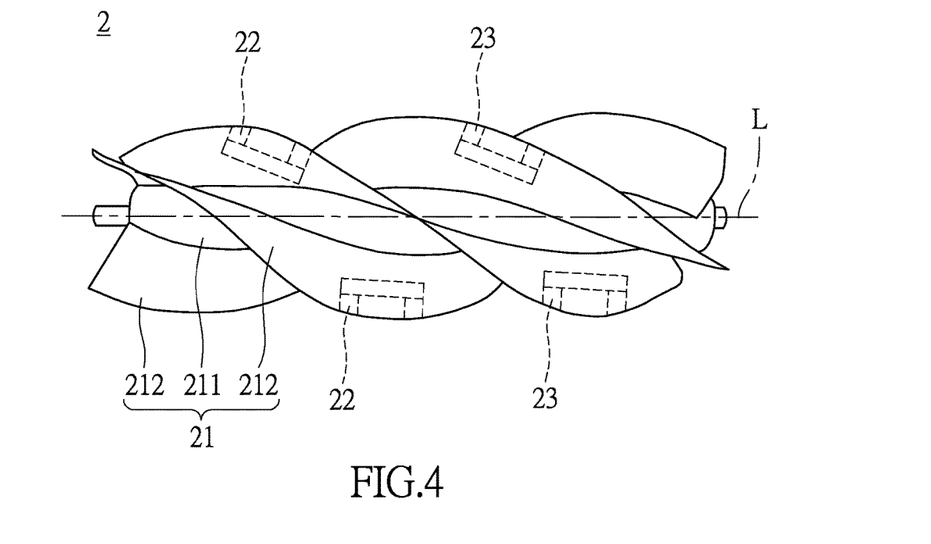
FIG. 4 is a perspective view showing a variation in the rotor assembly.

The rotating member 21 as shown in FIG. 3 has a single spiral blade 212 connected to the column 211 for example, but the number of the spiral blades 212 can be changed according to a designer's request. For example, as shown in FIG. 4, the rotating member 21 can have a plurality of spiral blades 212 connected to the column 211, and the position of the accommodating troughs 2121 of each spiral blade 212 can be determined by a designer's request.

Figure 5:
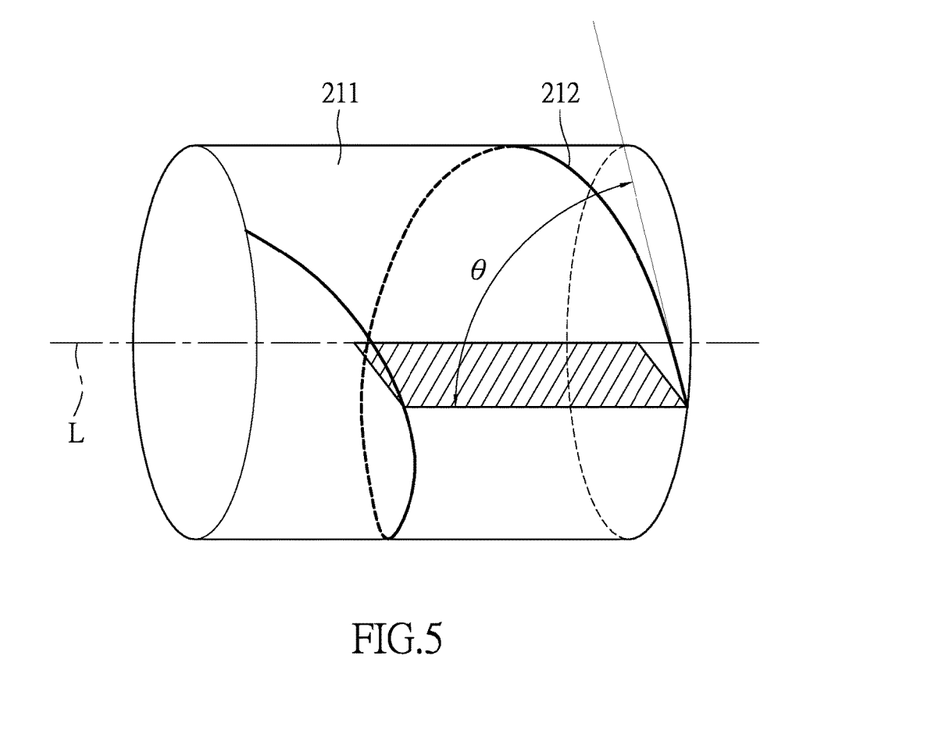
FIG. 5 is a schematic view showing the rotor assembly of the wind-driven electricity generation device.

Specifically, the spiral blade 212 has 0.8~1.5 pitch (e.g., 1 pitch, 1.1 pitch, or 1.2 pitch), a gap G is formed between the outer edge of the spiral blade 212 and the case 11, and the spiral blade 212 is connected to an outer surface of the column 211 at a helix angle $\Theta$ (as shown in FIG. 5) of 21~55 degrees. A spiral line in FIG. 5 is an inner edge of the spiral blade 212 connected to the column 211, and an angle between the axis L and a tangent of the spiral line is defined as the helix angle $\Theta$. Moreover, the length of the spiral blade 212 in the axis L is determined by the helix angle $\Theta$ and the diameter of the column 211, and the length of the spiral blade 212 is not limited by the figures of the instant embodiment.

Figure 6:
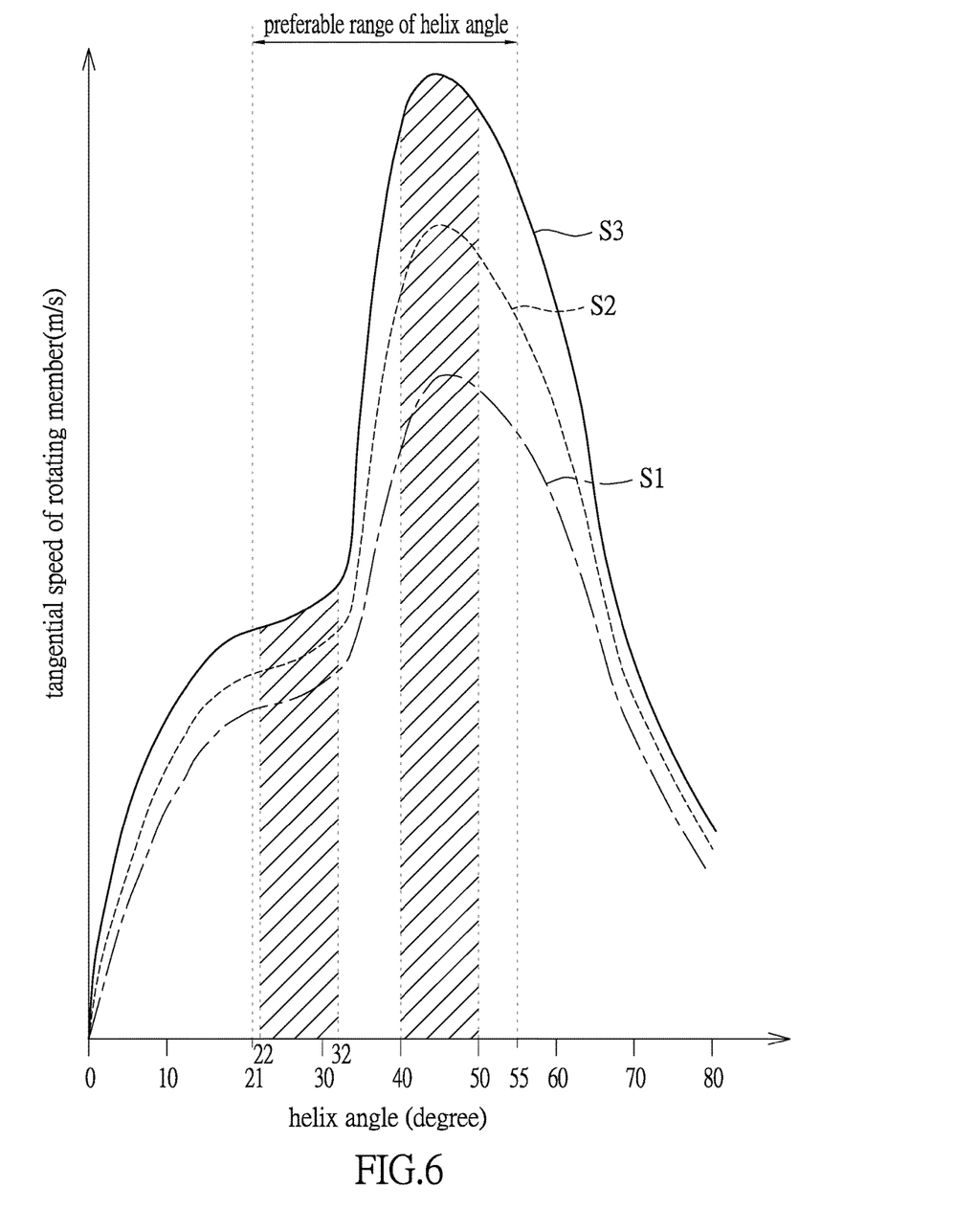
FIG. 6 is a first diagram showing a testing result, which is generated by taking a spiral angle of the spiral blade as a variable parameter to get a corresponding rotating speed of the rotating member.

FIG. 6 shows an experimental result generated by using a plurality of rotating members 21, which have the spiral blades 212 with different helix angles $\Theta$, under a specific wind velocity (e.g., curve S1 is the wind velocity of 6 m/s, curve S2 is the wind velocity of 8 m/s, curve S3 is the wind velocity of 10 m/s,). Accordingly, the rotating member 21 has a better tangential speed of the outer edge of the spiral blade 212 when the helix angle $\Theta$ is 21~55 degrees, and the rotating member 21 generates chaotic wind so as to obtain less torque when the helix angle $\Theta$ is not 21~55 degrees. Specifically, double of a distance between the outer edge of the spiral blade 212 and the axis L is defined as D (shown in FIG. 3), the rotating member 21 is operated at N rpm, T=1/N. Accordingly, the tangential speed in the instant embodiment means that the moving distance of the outer edge of the spiral blade 212 in per-second (i.e., $\pi D/60T$). In other words, the tangential speed of the rotating member 21 in the instant embodiment can be converted into $\pi DN/60$. That is to say, the tangential speed of the rotating member 21 in the instant embodiment can be presented by different unit according to the designer's demand.

Specifically, when the wind-driven electricity generation device 100 is applied in different environments, the spiral blade 212 should be provided with a corresponding helix angle $\Theta$ for causing the wind-driven electricity generation device 100 to run in a better operation mode. For example, when the wind-driven electricity generation device 100 is disposed at a fixed location (e.g., roof) for receiving a natural wind, if the natural wind is not stable, such as a typhoon, the spiral blade 212 needs a related structure for avoiding damage, which may be generated by the unstable natural wind. Moreover, when the wind-driven electricity generation device 100 is disposed on a moving object (e.g., vehicle) for receiving a wind, this wind is stable and predictable, so the spiral blade 212 can have a related structure for increasing the performance of the wind-driven electricity generation device 100.

Thus, according to many experiments, the helix angle $\Theta$ of the spiral blade 212 in the unstable wind environment is preferably 22~32 degrees, which is defined as a smaller helix angle Θ; the helix angle Θ of the spiral blade 212 in the stable and predictable wind environment is preferably 40~50 degrees, which is defined as a bigger helix angle Θ, and the spiral blade 212 has an excellent torque when the bigger helix angle Θ is about 45 degrees.

Figure 7:
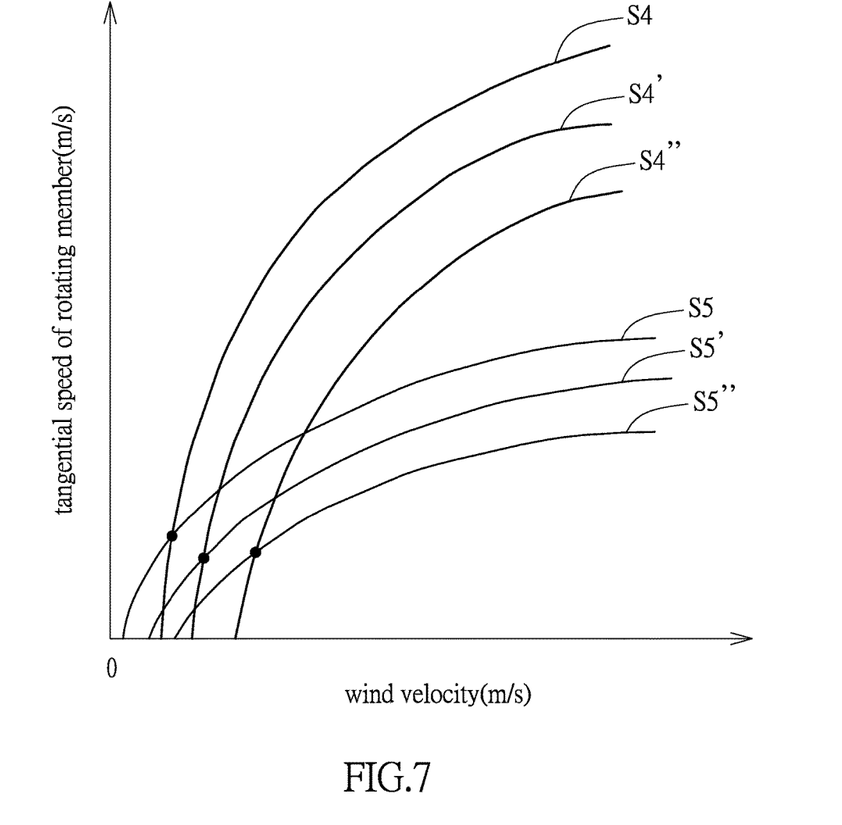
FIG. 7 is a second diagram showing a testing result, which is generated by taking wind velocity as a variable parameter to get a corresponding rotating speed of different rotating members.

FIG. 7 shows an experimental result generated by using the rotating members 21, which respectively have the smaller helix angles Θ and the bigger helix angles Θ, under different wind velocity for confirming the above values related to the helix angles Θ. When the wind velocity is greater than a specific value, the rotating members 21 having the bigger helix angles Θ (i.e., the curves S4, S4', S4" shown in FIG. 7) rotate faster and faster as the wind velocity is increased, so the spiral blades 212 are easily damaged by a strong breeze (e.g., typhoon). However, when the wind velocity is greater than a specific value, the rotating members 21 having the smaller helix angles Θ (i.e., the curves S5, S5', S5" shown in FIG. 7) smoothly and stably rotate as the wind velocity is increased, so the tangential speed of the rotating members 21 are not influenced by a strong breeze.

Specifically, if the rotating member 21 is provided with a different load (e.g., the load means the number of the magnet blocks 221 disposed on the rotating member 21), the experimental results will be different. The load of the rotating member 21 from small to big in the bigger helix angle Θ is the curve S4, the curve S4', and the curve S4" shown in FIG. 7, and the load of the rotating member 21 from small to big in the smaller helix angle Θ is the curve S5, the curve S5', and the curve S5" shown in FIG. 7. Thus, according to different environments and practical demands, a user can choose a suitable helix angle Θ and a suitable load for the rotating member 21.

As shown in FIG. 8, the first magnetic module 22 has two magnet blocks 221 (i.e., permanent magnets), an elongated magnetic conductor 222 (i.e., metallic material, silicon steel plate, or metallic block), and two position adjusting units 223. The two position adjusting units 223 are respectively installed in the two accommodating troughs 2121, and the two magnet blocks 221 are respectively arranged in the two accommodating troughs 2121 and are respectively mounted on the two position adjusting units 223. The magnetic conductor 222 is embedded in the spiral blade 212, and the two magnet blocks 221 are respectively connected to two opposite end portions of the magnetic conductor 222. Moreover, two opposite side edges of the magnetic conductor 222 in the instant embodiment respectively align two opposite edges of the magnet blocks 221 for entirely transmitting magnetic force, but are not limited thereto.

Specifically, ends of the two magnetic members 221 arranged away from the column 211 are respectively defined as two magnetic ends 2211 having different magnetisms (e.g., the top end of the left magnetic member 221 is N pole, and the top end of the left magnetic member 221 is S pole). The first magnetic module 22 is configured to generate two kinds of magnetic forces, which have different magnetisms, respectively emitted from the two magnetic ends 2211. The magnetic force generated from one of the two magnet blocks 221 can be transmitted to the other magnet block 221 through the magnetic conductor 222.

Each position adjusting unit 223 in the instant embodiment includes a spring 2231, a fixing frame 2232, and a movable frame 2233, but is not limited thereto. For example, the spring 2231 can be a compression spring, a tension spring, or the other component having elastic function.

The construction of each one of the stator assembly 1 and the rotor assembly 2 has been disclosed in the above description, the following description discloses the operating and the relative features of the stator assembly 1 and the rotor assembly 2.

As shown in FIG. 8, when the rotating member 21 is in a static mode, the magnet block 221 and the movable frame 2233 are disposed on the bottom of the accommodating trough 2121, and the position of the magnet block 221 with respect to the rotating member 21 (or the accommodating trough 2121) is defined as a first position.

Figure 9:
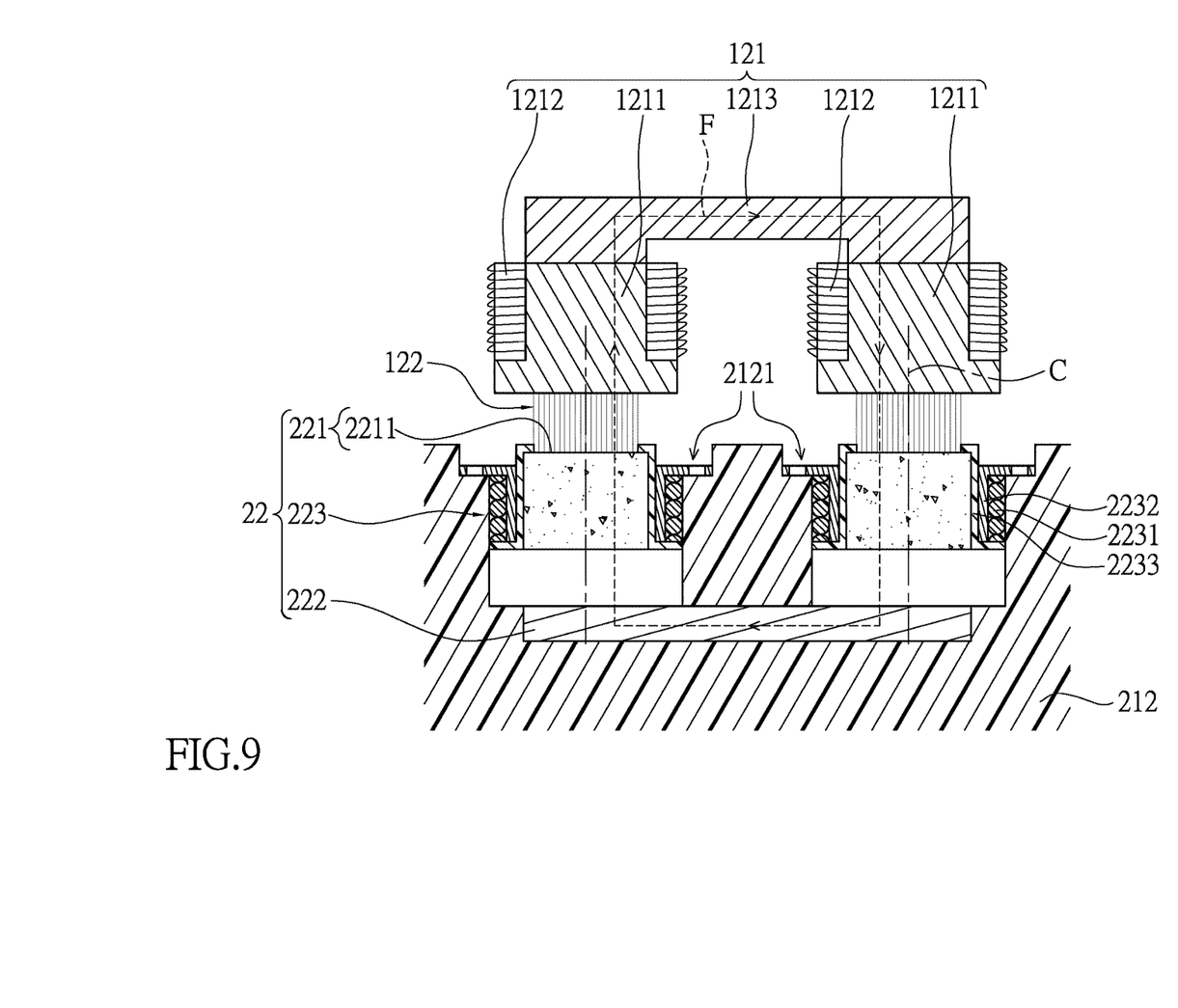
FIG. 9 is a cross-sectional view showing the first magnetic module and the corresponding first magnetically permeable module of FIG. 8 when the rotating member is rotated.

When an external wind flows into the channel 113 of the case 11 for providing a driving force to the spiral blade 212 of the rotating member 21, the rotating member 21 rotates along the axis L, and each magnet block 221 is driven to move away from the axis L by a centrifugal force generated from the rotation of the rotating member 21. Specifically, each magnet block 221 moves with respect to the rotating member 21 from the first position to a second position (as shown in FIG. 9), thereby deforming each spring 2231 to store an elastic force, which tends to move the corresponding magnet block 221 to the first position. Specifically, each magnet block 221 arranged at the second position is away from the bottom of the accommodating trough 2121 and does not protrude from the outer edge of the spiral blade 212 of the rotating member 21 (i.e., the opening end of the accommodating trough 2121).

Thus, when the rotating member 21 sustainedly rotates, the magnet blocks 221 fixed on the movable frame 2212 remain at the second position, so a distance between each magnet block 221 and the inner surface of the tube 111 of the case 11 maintains a smallest value, and each magnet block 221 can face the corresponding core 1211 in the radial direction (as shown in FIG. 9, the centerline C of each core 1211 passes through the corresponding magnet block 221) and can touch the corresponding magnetically permeable brush 122 when the rotating member 2 is rotated to a predetermined position, whereby the magnetic forces emitted from the magnetic ends 2211 of the two magnetic members 221 respectively pass through the two cores 1211 via the magnetically permeable brushes 122 to generate induced current for generating electricity.

Specifically, when the rotor assembly 2 rotates along the axis L to a predetermined position, the two magnetic ends 2211 of the first magnetic module 22 respectively face the two cores 1211 of the first magnetically permeable unit 121 in the radial direction and touch the free ends of the magnetically permeable brushes 122, such that two kinds of magnetic forces respectively emitted from the magnetic ends 2211 travel along the first magnetic module 22 (i.e., the two magnet blocks 221 and the magnetic conductor 222), the magnetically permeable brushes 122, and the first magnetically permeable unit 121 (i.e., the two cores 1211 and the magnetically connecting member 1213) to form as a magnetic loop F. The number of the first magnetically permeable units 121 of the first magnetically permeable module 12 is several, so the first magnetic module 22 can face the first magnetically permeable units 121 in sequence when the rotor assembly 2 is rotated, thereby the first magnetic module 22 can be cooperated with each magnetically permeable unit 121 to form a magnetic loop F as the rotor assembly 2 rotates one circle.

When the external wind does not flow into the channel 113 of the case 11, the rotating rate of the rotating member 21 gradually reduces until the rotating member 21 is in the static mode, so the centrifugal force will be smaller than the elastic force. Thus, the spring 2231 will release the elastic force to push the fixing frame 2232 and the movable frame 2233, thereby driving the magnet block 221 fixed on the movable frame 2233 to move from the second position to the first position.

In addition, as shown in FIGS. 2 through 4, the stator assembly 1 in the instant embodiment can be provided with a second magnetically permeable module 13 installed on the outer case 11, and the second magnetically permeable module 13 includes a plurality of second magnetically permeable units 131. The rotor assembly 2 in the instant embodiment can be provided with a second magnetic module 23 disposed on the spiral blade 212 of the rotating member 21. The construction and the arrangement of the second magnetically permeable module 13 and the second magnetic module 23 are respectively identical to the construction and the arrangement of the first magnetically permeable module 12 and the first magnetic module 22, so the construction and the arrangement of the second magnetically permeable module 13 and the second magnetic module 23 are not discussed in the instant embodiment.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A wind-driven electricity generation device, comprising:
   a stator assembly, comprising:
   a case, wherein the case surroundingly defines a channel, and the case defines an axis passing through the channel; and
   a magnetically permeable module disposed on an inner surface of the case, the magnetically permeable module has a magnetically permeable unit having at least one coil and a magnetically permeable brush disposed on the magnetically permeable unit, the magnetically permeable brush is resilient and arranged in the channel; and
   a rotor assembly rotatably arranged in the channel of the case, comprising:
   a rotating member having a column and at least one spiral blade, wherein the column is rotatable along the axis, the spiral blade is connected to an outer surface of the column at a helix angle of 21~55 degrees, a gap is formed between the case and an outer edge of the spiral blade; and
   a magnetic module disposed on the rotating member, the magnetic module has at least one magnetic end, wherein when the rotor assembly rotates along the axis to a predetermined position forced by a position adjusting unit, the magnetic end of the magnetic module faces the magnetically permeable unit in a radial direction perpendicular to the axis and touches the magnetically permeable brush, such that a magnetic force emitted from the magnetic end travels along the magnetically permeable brush and the magnetically permeable unit,
   wherein the spiral blade is configured to be driven by utilizing fluid to rotate the rotor assembly with respect to the stator assembly, so that the magnetic module induces the magnetically permeable unit to generate induced current.

2. The wind-driven electricity generation device as claimed in claim 1, wherein the helix angle of the spiral blade is 40~50 degrees.

3. The wind-driven electricity generation device as claimed in claim 1, wherein the helix angle of the spiral blade is 22~32 degrees.

4. The wind-driven electricity generation device as claimed in claim 1, wherein a length of the spiral blade in the axis is greater than a height of the spiral blade, the height defined as twice the distance between the outer edge of the spiral blade and the axis.

5. The wind-driven electricity generation device as claimed in claim 1, wherein the magnetic module is disposed on the spiral blade.

* * * * *